(12) United States Patent
Koh

(10) Patent No.: US 7,344,060 B2
(45) Date of Patent: Mar. 18, 2008

(54) APPARATUS AND METHOD FOR ALIGNING SOLDER PADS DURING HEAD GIMBAL ASSEMBLY SOLDERING

(75) Inventor: Choon Kuay Koh, Jalan Batu (SG)

(73) Assignee: Hitachi Global Storage Technologies Netherlands, B.V., Amsterdam (NL)

(*) Notice: Subject to any disclaimer, the term of this patent is extended or adjusted under 35 U.S.C. 154(b) by 309 days.

(21) Appl. No.: 10/951,496

(22) Filed: Sep. 27, 2004

(65) Prior Publication Data
US 2006/0065700 A1 Mar. 30, 2006

(51) Int. Cl.
*B23K 31/02* (2006.01)
*B23K 37/00* (2006.01)

(52) U.S. Cl. .............. 228/179.1; 228/49.1; 228/180.21

(58) Field of Classification Search ............. None
See application file for complete search history.

(56) References Cited

U.S. PATENT DOCUMENTS

| | | | | | |
|---|---|---|---|---|---|
| 4,050,469 | A | * | 9/1977 | Lin | 132/143 |
| 5,574,234 | A | * | 11/1996 | Schudel | 73/865.9 |
| 5,637,807 | A | * | 6/1997 | Kliewer et al. | 73/862.541 |
| 5,832,764 | A | * | 11/1998 | Girard | 72/16.3 |
| 5,927,295 | A | * | 7/1999 | Quinones | 132/216 |
| 6,493,187 | B2 | * | 12/2002 | Pace et al. | 360/244.8 |
| 6,848,167 | B2 | * | 2/2005 | Mita et al. | 29/603.02 |
| 6,891,700 | B2 | * | 5/2005 | Shiraishi et al. | 360/245.9 |
| 2004/0257708 | A1 | * | 12/2004 | Erpelding | 360/245.9 |
| 2005/0209797 | A1 | * | 9/2005 | Anderson et al. | 702/57 |

* cited by examiner

*Primary Examiner*—Kiley Stoner
(74) *Attorney, Agent, or Firm*—Duke Amaniampong (57) ABSTRACT

A device for orienting an integrated lead suspension tail during a head gimbal assembly soldering operation of a head stack assembly process is disclosed. The device includes a body portion and at least one pin extending from the body portion. The pin(s) is configured to position the integrated lead suspension tail proximate to a main flex cable such that electrical coupling between the integrated lead suspension tail and the main flex cable is established upon completion of said head gimbal assembly soldering operation. The pin(s) has sufficient length to extend past a terminal end of the main flex cable.

20 Claims, 8 Drawing Sheets

600 begin providing a body portion of an integrated lead suspension tail separator
610 providing at least one pin extending from the body portion, the pin configured to orient an integrated lead suspension tail proximate to a main flex cable such that electrical coupling between the integrated lead suspension tail and the main flex cable is established upon completion of the head gimbal assembly soldering operation, wherein the pin has sufficient length to extend past a terminal end of the main flex cable
620 continue

```
begin
  ↓
inserting at least one pin of an integrated lead suspension tail
separator proximate to the integrated lead suspension tail, the
pin inserted to a position below a first group of solder pads
located on the integrated lead suspension tail and a second
group of solder pads located on the main flex cable, wherein the
inserting causes the integrated lead suspension tail to be biased
toward the main flex cable so that the first group of solder pads
contact complementary ones of said second group of solder
pads.
710
  ↓
reflowing solder from the first group of solder pads and the
complementary ones of the second group of solder pads
720
  ↓
removing the integrated lead suspension tail separator, wherein
a gap width between the integrated lead suspension tail and the
main flex cable is substantially constant from one electrical
coupling to another upon completion of the head stack
assembly process
730
  ↓
continue
```

FIG. 7

APPARATUS AND METHOD FOR ALIGNING SOLDER PADS DURING HEAD GIMBAL ASSEMBLY SOLDERING

RELATED ART

The method for manufacturing read/write heads for memory devices such as hard drive memory has evolved significantly over the past decade. The process for manufacturing the read/write heads is referred to as the head stack assembly (HSA) process. Part of the HSA process includes soldering the head gimbal assemblies (HGA's) to a main flex cable. This is accomplished through aligning a series of solder pads on the main flex cable with a series of solder pads on the integrated lead suspension (ILS) tails of the HGA and reflowing the solder to provide a connection.

Once the solder reflow is complete, gaps exist between the main flex and the HGA. It is desirable that the gaps be consistent in width from one solder connection to the other. The aligning process requires that the solder pads of the HGA ILS tails touch the main flex solder pads. However, when the ILS tails are inserted between fingers of the main flex cable, spaces may exist between the ILS tail and the main flex fingers. In order to eliminate these spaces and provide contact between the solder pads, a comb-type prior art device was used. "Teeth" of this device may be inserted to abut the terminal end of the main flex cable, just short of the locations of the solder pads, thereby pushing the ILS tails outward toward the main flex cable.

However, this prior art device does not assure consistent gaps. The solder pads proximal to the terminal ends of the teeth of the comb device may be contacting each other, while the solder pads further back from terminal ends of the teeth may not be contacting each other, due in part to flexibility of the ILS tails. Therefore, the desirable consistency of gap widths may not be accomplished. Additionally, the prior art device is not adjustable to accommodate variations in pitch and spacing of solder pads.

SUMMARY

A device for orienting an integrated lead suspension tail during a head gimbal assembly soldering operation of a head stack assembly process is disclosed. The device includes a body portion and at least one pin extending from the body portion. The at least one pin is configured to position the integrated lead suspension tail proximate to a main flex cable such that electrical coupling between the integrated lead suspension tail and the main flex cable is established upon completion of said head gimbal assembly soldering operation. The at least one pin has sufficient length to extend past a terminal end of the main flex cable.

DETAILED DESCRIPTION

Reference will now be made in detail to embodiments of the invention, examples of which are illustrated in the accompanying drawings. While the invention will be described in conjunction with the embodiments, it will be understood that they are not intended to limit the invention to these embodiments. Furthermore, in the following detailed description, numerous specific details are set forth in order to provide a thorough understanding of the present invention. In other instances, well known methods, procedures, and components have not been described in detail so as not to unnecessarily obscure aspects of the present invention.

Embodiments of the present invention include an apparatus and method for aligning solder pads during head gimbal assembly soldering. Embodiments of the present invention provide contact between solder pads on HGA ILS tails and solder pads on fingers of the main flex cable so that, following solder reflow, consistent gap widths exist between the ILS tails and the main flex cable fingers. This is achieved by inserting a tail separator device next to each ILS tail, underneath all of the solder pads, so that all of the solder pads on the ILS tail are pushed with equal force toward all of the corresponding solder pads on the adjacent finger of the main flex cable.

Figure 6:
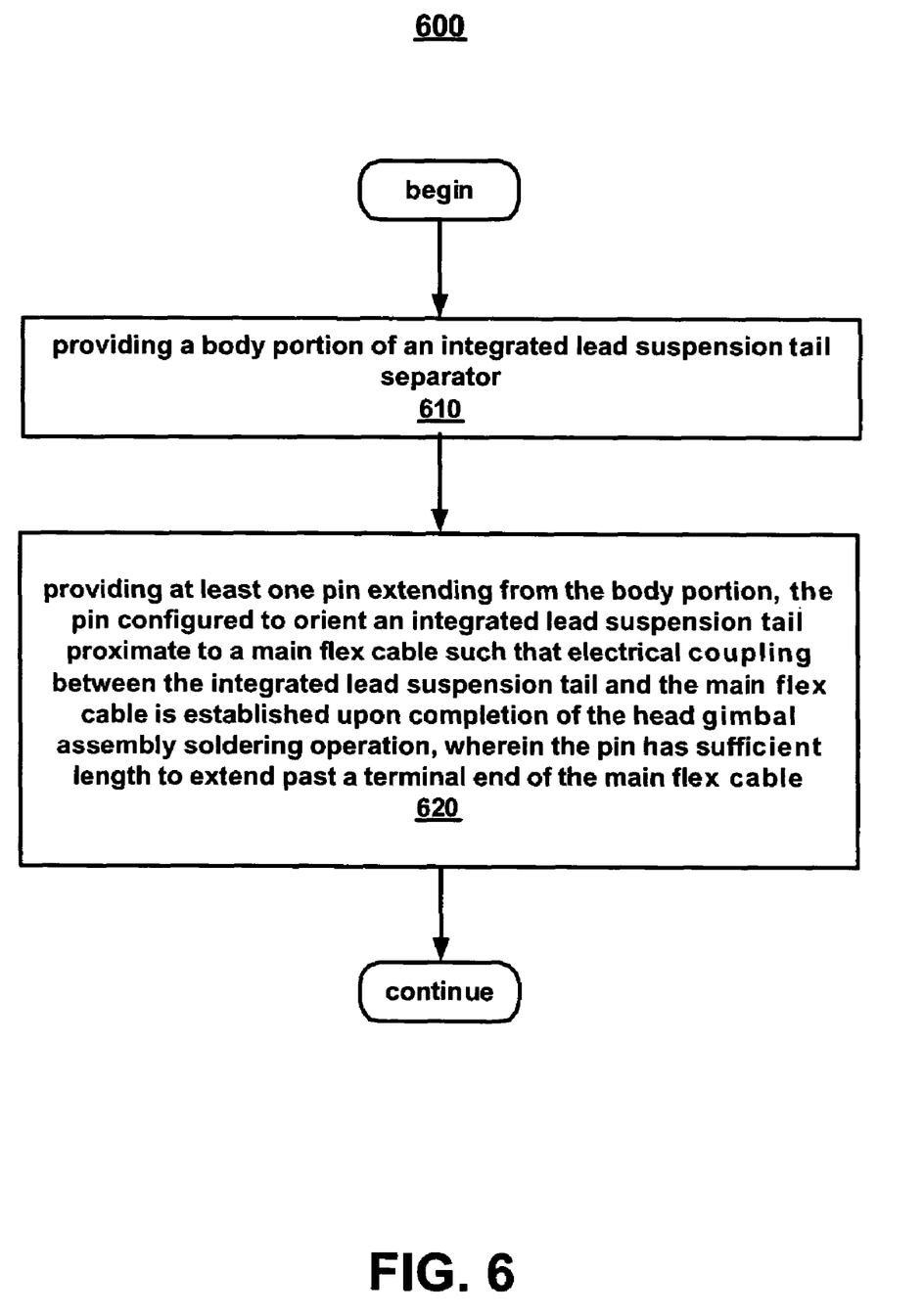
FIG. 6 is a flow diagram of a method for establishing electrical coupling between an integrated lead suspension tail and a main flex cable during a head gimbal assembly soldering operation of a head stack assembly process, in accordance with one embodiment of the present invention.
Figure 7:
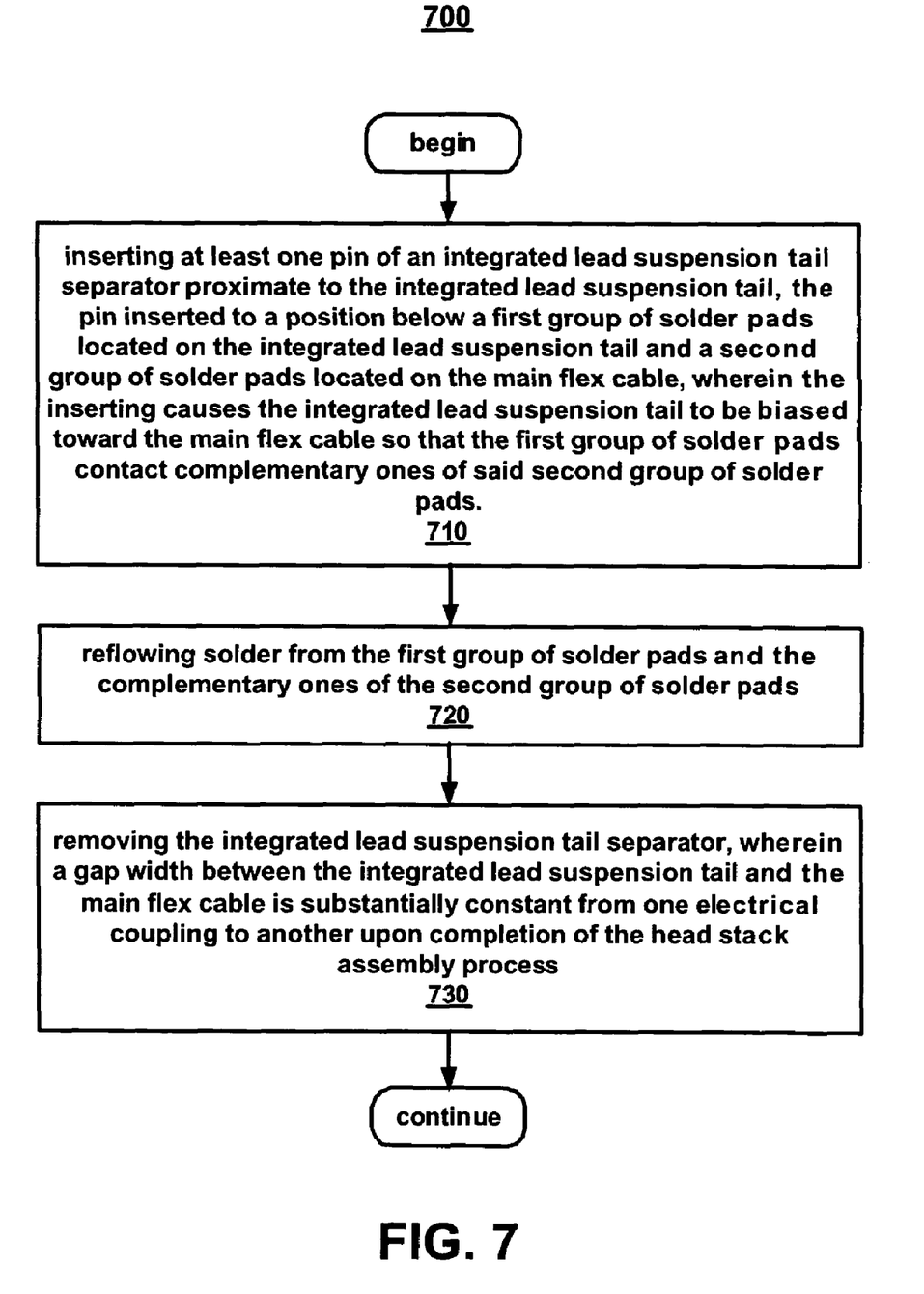
FIG. 7 is a flow diagram of a method for maintaining consistent gap widths between an electrical coupling of an integrated lead suspension tail of a head gimbal assembly and a main flex cable during a head stack assembly process, in accordance with one embodiment of the present invention.

Certain portions of the detailed descriptions of embodiments of the invention, which follow, are presented in terms of processes and methods (e.g., methods 600 of FIG. 6 and 700 of FIG. 7). Although specific steps are disclosed herein describing the operations of these processes and methods, such steps are exemplary. That is, embodiments of the present invention are well suited to performing various other steps or variations of the steps recited in the processes and methods herein.

Figure 1:
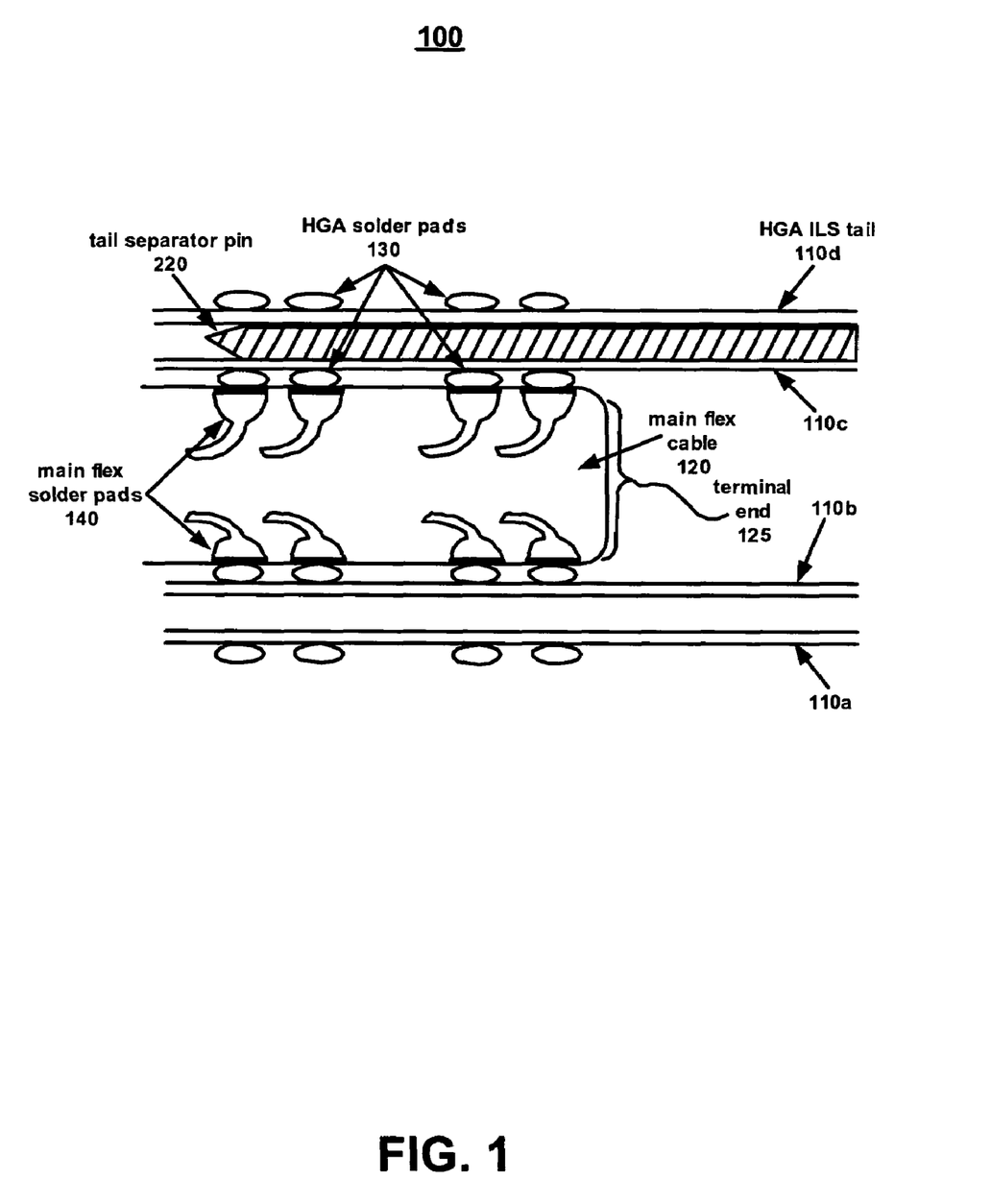
FIG. 1 is a plan view of a portion of a head stack assembly illustrating ILS tail solder pads and main flex cable solder pads, in accordance with one embodiment of the present invention.

FIG. 1 is a plan view of a portion 100 of an HSA illustrating HGA ILS tail solder pads 130 and main flex solder pads 140, in accordance with one embodiment of the present invention. Plan view of portion 100 is only for purposes of illustration, and should not be construed to be drawn to scale. The HGA ILS solder pads 130 are located on HGA ILS tails 110*a,* 110*b,* 110*c* and 110*d,* and are spaced to align with main flex solder pads 140 that are located near the terminal end 125 of main flex cable 120. The terminal end 125 of main flex cable 120 may also, according to one embodiment, be referred to as "fingers" of main flex cable 120.

In one embodiment of the present invention, there are two ILS tails 110b and 110c and an intervening main flex cable finger 120 associated with each head in an HSA. Thus, adjacent heads would have adjacent ILS tails, e.g., ILS tails 110a and 110b or 110c and 110d. However, a top head or a bottom head may have an ILS tail 110c or 110b that has no adjacent ILS tails 110a or 110d, respectively.

Figure 2:
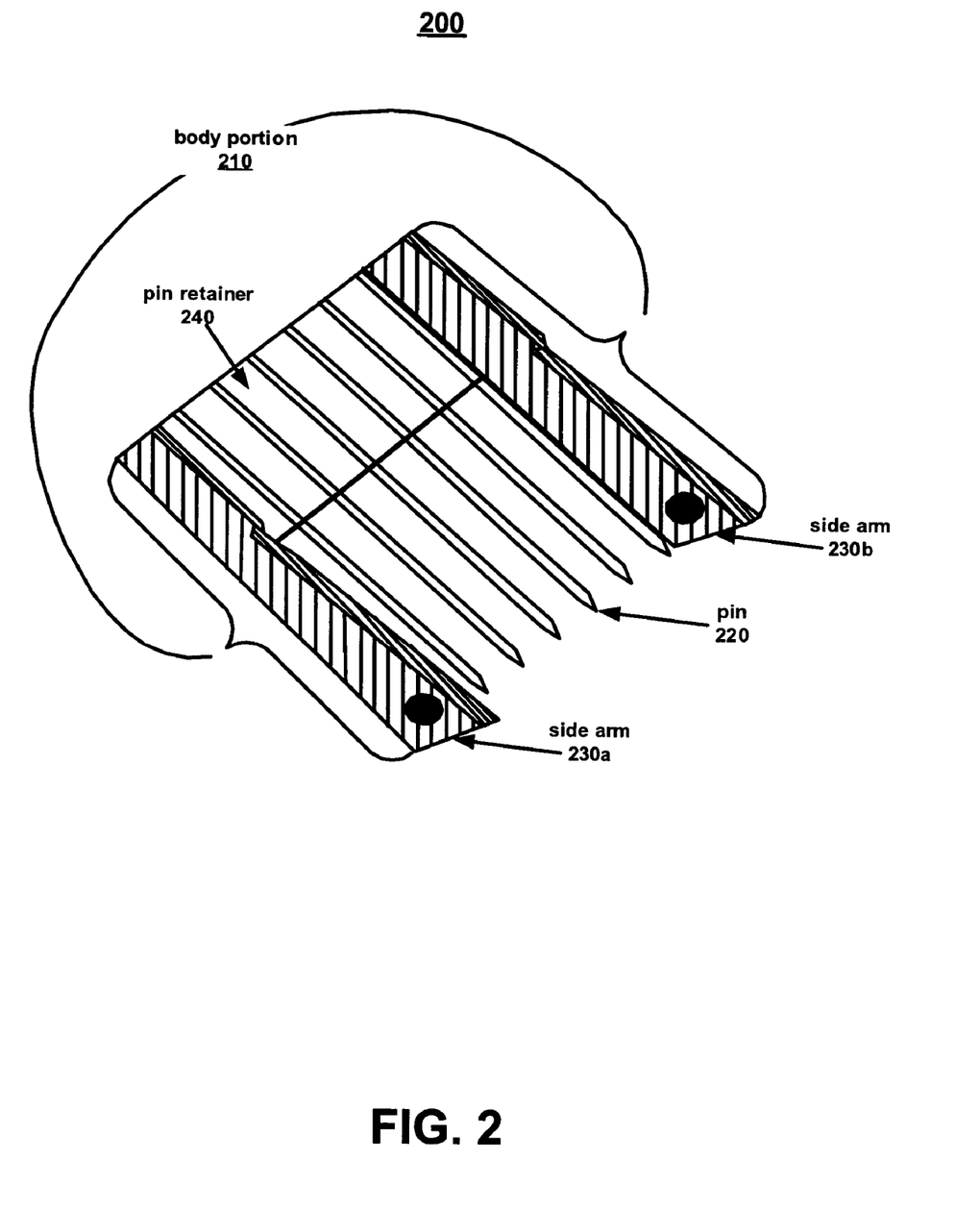
FIG. 2 is an oblique plan view of a tail separator, in accordance with one embodiment of the present invention.

In order to assure that solder pads 130 are in contact with solder pads 140 to form a solder bond during an HGA solder operation, according to one embodiment, a pin 220 of a tail separator (as shown in FIG. 2 below) may be inserted between ILS tails 110c and 110d so as to extend beyond terminal end 125 to push ILS tail 110c, for example, toward main flex cable 120.

FIG. 2 is an oblique plan view of a tail separator 200, in accordance with one embodiment of the present invention. Tail separator 200 is a device for orienting an integrated lead suspension tail (e.g., ILS 110a of FIG. 1) during a head gimbal assembly (HGA) soldering operation of a head stack assembly (HSA) process. Tail separator 200 has, according to the present embodiment, a body portion 210 and at least one pin 220 extending from the body portion 210, wherein pin 220 is configured to position the ILS tail proximate to a main flex cable (e.g., main flex cable 120 of FIG. 1) such that electrical coupling between the ILS tail and main flex cable is established upon completion of the HGA soldering operation and wherein pin 220 has sufficient length to extend past a terminal end (e.g., terminal end 125 of FIG. 1) of the main flex cable.

According to one embodiment of the present invention, the at least one pin 220 separates adjacent ILS tails during the HGA soldering operation. The sufficient length of pin 220 is adjustable to accommodate variations in the ILS tails and the main flex cable.

According to another embodiment, tail separator 200 has a plurality of pins 220, such as, for example, one pin for each side of a head. This may result in the number of pins equaling the number of heads plus one. However, the number of pins should not be so limited, but rather, the number of pins may vary to accommodate a variation of HSA designs.

According to one embodiment, body portion 210 of tail separator 200 has two side arms 230a and 230b that are adapted to fit on each side of the HGA section of an HSA so that a tail separator pin 220 may be inserted adjacent to ILS tails (e.g. ILS tails 110c and 110d of FIG. 1) and extend beyond the terminal end 125 of the main flex cable 120 as shown in FIG. 1.

According to one embodiment, pin retainer 240 is a section of body portion 210 that resides between side arms 230a and 230b to retain pins 220. Pin retainer 240 may be designed, according to one embodiment, to allow adjustments in pin 220 length and location to accommodate variations in the pitch and spacing of solder pads and spacing of ILS tails.

Figure 3:
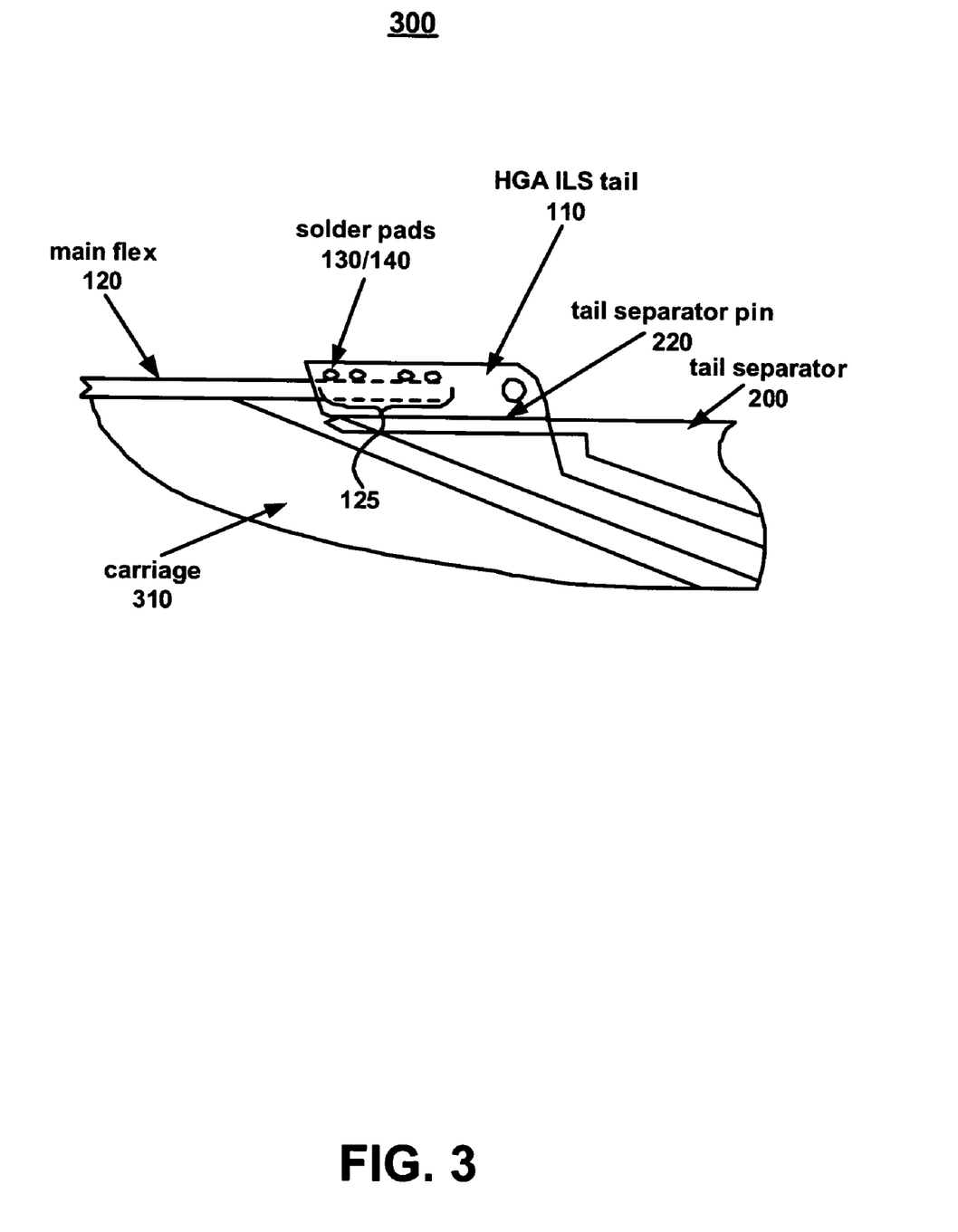
FIG. 3 is a side view illustrating a portion of a head stack assembly with tail separator pins inserted in preparation for HGA soldering, in accordance with one embodiment of the present invention.

FIG. 3 is a side view illustrating a portion 300 of a head stack assembly with a tail separator pin 220 inserted in preparation for an HGA soldering operation, in accordance with one embodiment of the present invention. Carriage 310 is shown to support the head stack assembly containing portion 300 during the operation of solder bonding HGA ILS tail 110 to main flex cable 120. Tail separator 200 may, in one embodiment, contain at least one tail separator pin 220, or it may, in another embodiment, contain a plurality of tail separator pins 220.

FIG. 3, according to embodiments of the present invention, shows tail separator pin 220, when inserted beyond the terminal end 125 of main flex cable 120, residing beneath solder pads 130 on HGA ILS tail 110 and solder pads 140 on main flex cable 120. The insertion of tail separator pin 220 beyond terminal end 125 forces ILS tail 110 toward main flex cable 120, causing the solder pads 130 and 140 to contact one another. This contact can be maintained through the solder reflow process, provided tail separator pin 220 remains inserted. Once the solder reflow is complete, tail separator 200 may be removed.

Figure 4:
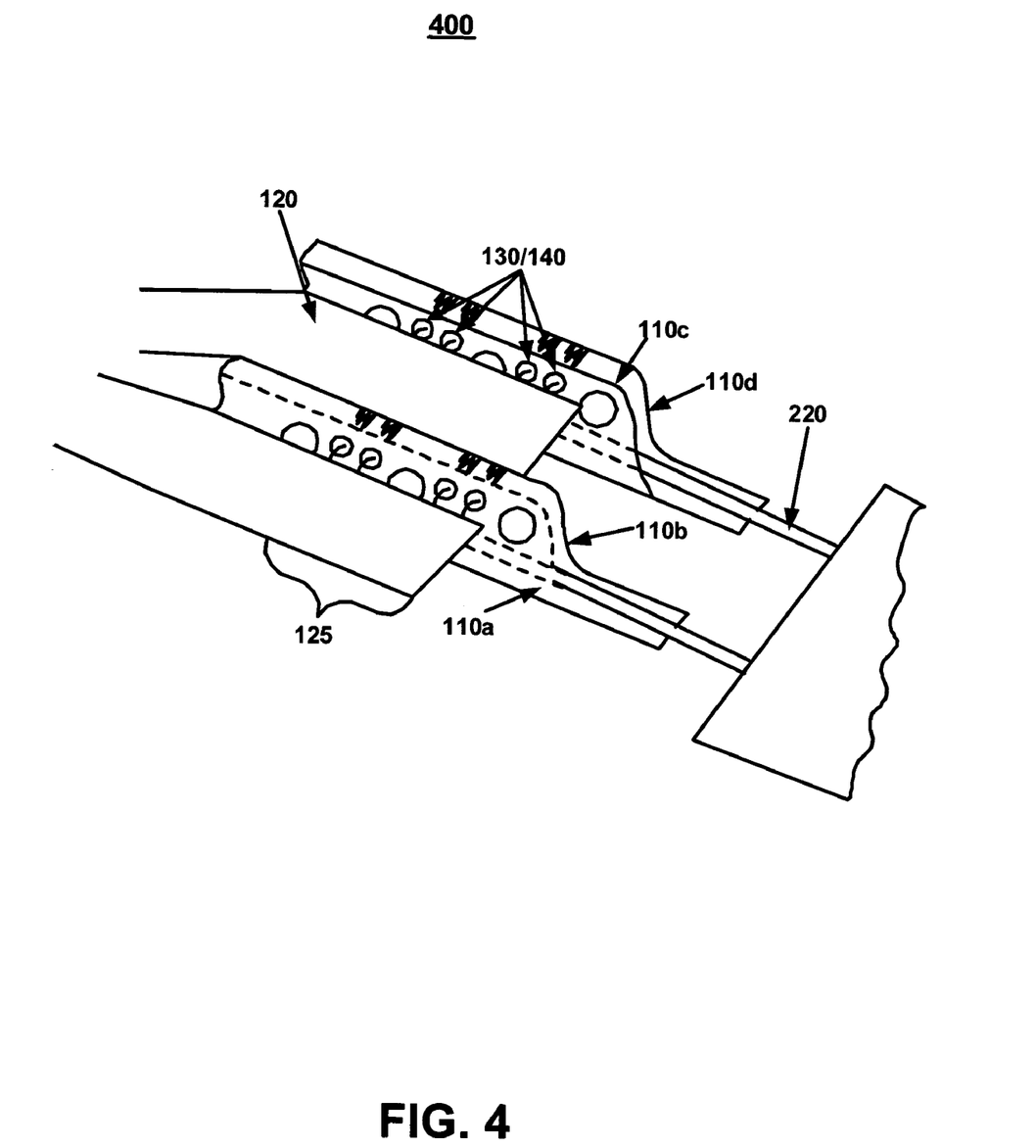
FIG. 4 is an oblique plan view illustrating a portion of a head stack assembly with tail separator pins being inserted in preparation for HGA soldering, according to one embodiment of the present invention.

FIG. 4 is an oblique plan view illustrating a portion 400 of a head stack assembly with tail separator pins 220 being inserted in preparation for HGA soldering, according to one embodiment of the present invention. As tail separator pin 220 is inserted between ILS tails 110c and 110d and past the terminal end 125 of fingers of main flex cable 120, the ILS tails 110c and 110d are pushed toward the fingers of the main flex cable 120, e.g., ILS tail 110c is pushed toward main flex finger 120 as shown. Thus, solder pads 140 on the main flex 120 and solder pads 130 on the ILS tails (not seen, but residing on the distal side of solder pads 140) achieve contact so as to form consistent bonding following the reflow process.

Figure 5A:
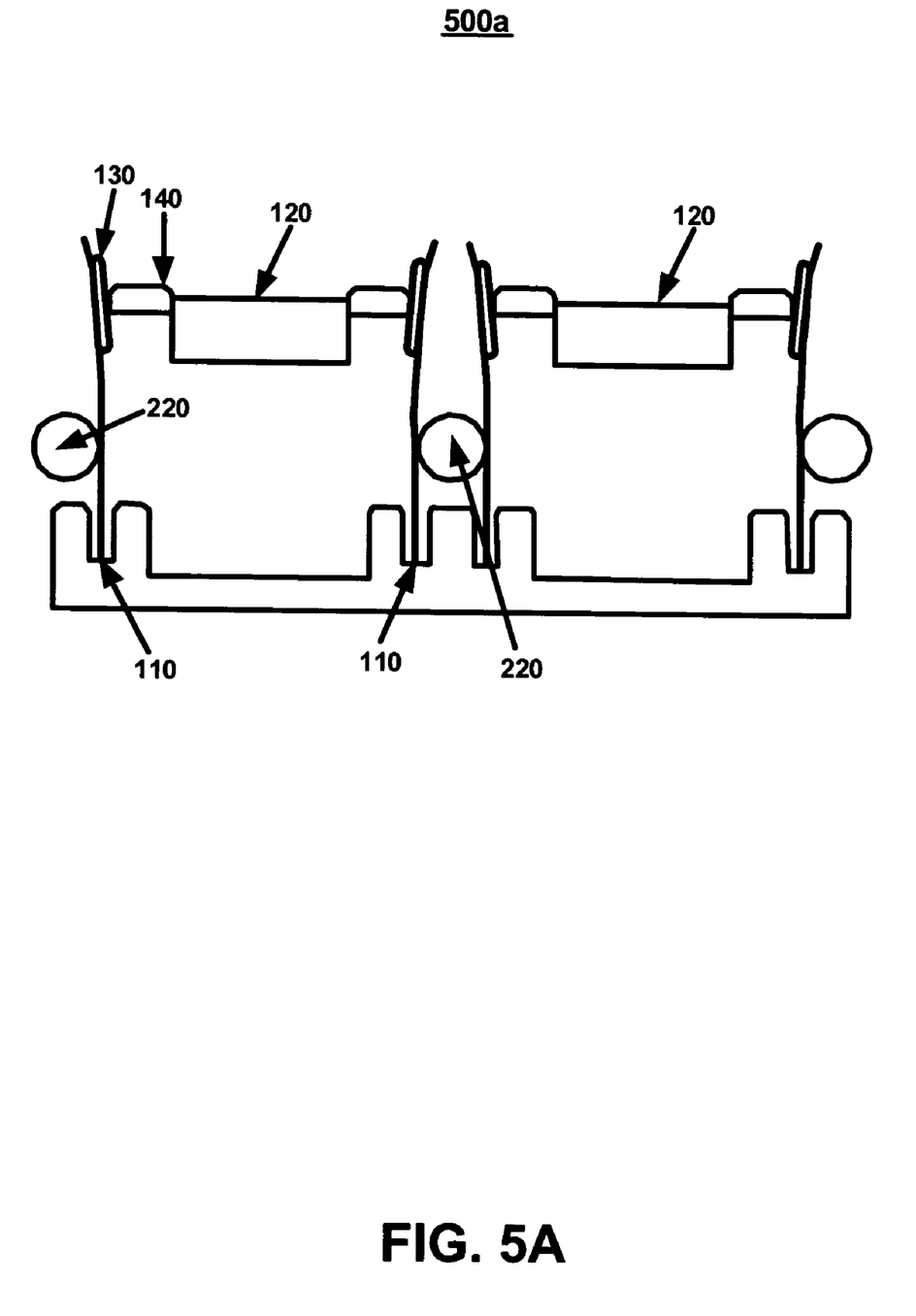
FIG. 5A is a cross-sectional view of main flex cable fingers and ILS tails with tail separator pins inserted prior to being soldered, according to one embodiment of the present invention.

FIG. 5A is a cross-sectional view of main flex cable fingers 120 and ILS tails 110 with tail separator pins 220 inserted prior to being soldered, according to one embodiment of the present invention. It can be seen that ILS tails 110 are pushed by tail separator pins 220 toward main flex cable fingers 120 so that solder pads 130 on ILS tails 110 are contacting solder pads 140 on main flex cable fingers 120.

Figure 5B:
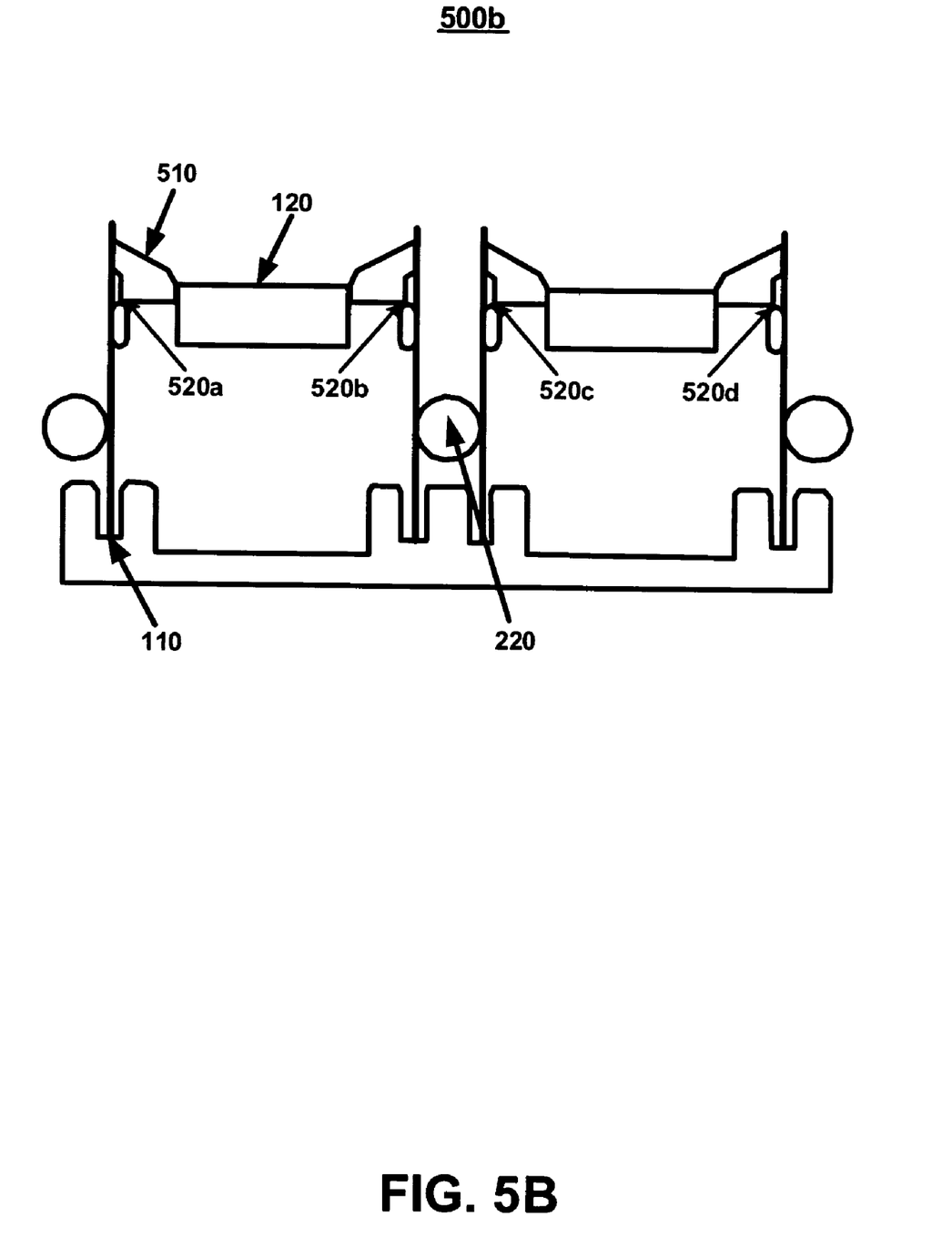
FIG. 5B is a cross-sectional view of main flex cable fingers and ILS tails with tail separator pins inserted following HGA soldering, according to one embodiment of the present invention.

FIG. 5B is a cross-sectional view of main flex cable fingers 120 and ILS tails 110 with tail separator pins 220 inserted following HGA soldering, according to one embodiment of the present invention. Solder bond 510 results from the reflow process during HGA soldering. The HGA ILS tail 110 becomes substantially perpendicular to the main flex cable finger 120 following the HGA soldering. Small gaps 520a, 520b, 520c and 520d may remain between the ILS tails 110 and the main flex cable fingers 120. These gaps are substantially consistent in width, and the solder bonds 510 bridge the gaps 520a, 520b, 520c and 520d so that the coupling of the HGA ILS tails 110 and the main flex cable fingers 120 may be robust. By substantially consistent, what is meant is that there may be no visible difference in the gap widths, and that the solder bonds 510 care able to bridge the gaps for establishing electrical coupling.

FIG. 6 is a flow diagram of a method 600 for establishing electrical coupling between an ILS tail and a main flex cable during an HGA soldering operation of a head stack assembly process, in accordance with one embodiment of the present invention.

At step 610 of method 600, a body portion of an integrated lead suspension tail separator is provided. The body portion (e.g., body portion 210 in FIG. 2), according to one embodiment, has two side arms 230a and 230b that are adapted to fit on each side of the HGA section of an HSA so that pins may be inserted adjacent to ILS tails (e.g., ILS tails 110a, 110b, 110c and 110d of FIG. 1) and beneath solder pads (e.g., solder pads 130 and 140 of FIG. 1).

At step 620, in accordance with one embodiment, at least one pin is provided. The pin extends from the body portion and is configured to orient the integrated lead suspension tail proximate to a main flex cable. This orienting is such that electrical coupling between the integrated lead suspension tail and the main flex cable is established upon completion of the head gimbal assembly soldering operation, wherein the at least one pin has sufficient length to extend past a terminal end of the main flex cable.

FIG. 7 is a flow diagram of a method for maintaining consistent gap widths between an electrical coupling of an ILS tail of an HGA and a main flex cable during a head stack assembly process, in accordance with one embodiment of the present invention.

At step 710, according to one embodiment, at least one pin of an integrated lead suspension tail separator is inserted proximate to at least one integrated lead suspension tail, wherein the at least one pin is inserted to a position below a first plurality of solder pads, located on the at least one integrated lead suspension tail, and a second plurality of solder pads, located on the main flex cable. The inserting causes the at least one integrated lead suspension tail to be inclined toward the main flex cable so that the first plurality of solder pads contact complementary ones of the second plurality of solder pads.

At step 720 of method 700, according to one embodiment of the present invention, solder is reflowed at the first plurality of solder pads and the complementary ones of the second plurality of solder pads. Following the reflow process, a solder bond (e.g., solder bond 510 of FIG. 5B) is established.

At step 730 of method 700, the integrated lead suspension tail separator is removed, in accordance with one embodiment, wherein a gap (e.g., gap 520a) width between the integrated lead suspension tail and said main flex cable is substantially constant from one electrical coupling to another upon completion of the head stack assembly process.

Thus, the present invention provides, in various embodiments, an apparatus and method for aligning solder pads during head gimbal assembly soldering. The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A system comprising: an intergrated lead suspension tail, a main flex cable, and a device for orienting said integrated lead suspension tail during a head gimbal assembly soldering operation of a head stack assembly process, said device comprising: a body portion; and at least one pin extending from said body portion, said at least one pin positioning said integrated lead suspension tail proximate to said main flex cable such that electrical coupling between said integrated lead suspension tail and said main flex cable is established upon completion of said head gimbal assembly soldering operation, said at least one pin having sufficient length to extend past a terminal end of said main flex cable.

2. The device as described in claim 1, wherein said at least one pin separates adjacent said integrated lead suspension tails during said head gimbal assembly soldering operation.

3. The device as described in claim 1, wherein said sufficient length is adjustable to accommodate variations in said integrated lead suspension tails and said main flex cable.

4. The device as described in claim 1, wherein said at least one pin comprises a plurality of pins.

5. The device as described in claim 4, wherein a pitch of said plurality of pins is adjustable to accommodate variations in said integrated lead suspension tails and said main flex cable.

6. The device as described in claim 1, wherein a gap width between said integrated lead suspension tail and said main flex cable is substantially constant from one said electrical coupling to another upon completion of said head stack assembly process.

7. The device as described in claim 1, wherein said sufficient length further comprises extending below at least one solder pad residing on said integrated lead suspension tail and a complementary at least one solder pad residing on said main flex cable.

8. The device as described in claim 7 wherein said extending below biases said orientation of said integrated lead suspension tail toward said main flex cable so that said at least one solder pad residing on said integrated lead suspension tail and a complementary at least one solder pad residing on said main flex cable establish contact.

9. A method for establishing electrical coupling between an integrated lead suspension tail and a main flex cable during a head gimbal assembly soldering operation of a head stack assembly process, said method comprising:
providing a body portion of an integrated lead suspension tail separator; and
providing at least one pin extending from said body portion, pin positioning said integrated lead suspension tail proximate to a main flex cable such that electrical coupling between said integrated lead suspension tail and said main flex cable is established upon completion of said head gimbal assembly soldering operation, said at least one pin having sufficient length to extend past a terminal end of said main flex cable.

10. The method as recited in claim 9, wherein said at least one pin separates adjacent said integrated lead suspension tails during said head gimbal assembly soldering operation.

11. The method as recited in claim 9, wherein said sufficient length is adjustable to accommodate variations in said integrated lead suspension tails and said main flex cable.

12. The method as recited in claim 9, wherein said at least one pin comprises a plurality of pins.

13. The method as recited in claim 12, wherein a pitch of said plurality of pins is adjustable to accommodate variations in said integrated lead suspension tails and said main flex cable.

14. The method as recited in claim 9, wherein said sufficient length further comprises extending below at least one solder pad residing on said integrated lead suspension tail and a complementary at least one solder pad residing on said main flex cable.

15. A method for maintaining consistent gap widths between an electrical coupling of at least one integrated lead suspension tail of a head gimbal assembly and a main flex cable during a head stack assembly process, said method comprising:
inserting at least one pin of an integrated lead suspension tail separator proximate to said at least one integrated lead suspension tail, said at least one pin inserted to a position below a first plurality of solder pads located on said at least one integrated lead suspension tail and a second plurality of solder pads located on said main flex cable, wherein said inserting causes said at least one integrated lead suspension tail to be inclined toward said main flex cable so that said first plurality of solder pads contact complementary ones of said second plurality of solder pads.

16. The method as recited in claim 15, further comprising:
reflowing solder from said first plurality of solder pads and said complementary ones of said second plurality of solder pads; and
removing said integrated lead suspension tail separator, wherein a gap width between said integrated lead suspension tail and said main flex cable is substantially constant from one said electrical coupling to another upon completion of said head stack assembly process.

17. The method as recited in claim 15, wherein said at least one pin separates adjacent said integrated lead suspension tails during said head gimbal assembly soldering operation.

18. The method as recited in claim 15, wherein a length of said at least one pin is adjustable to accommodate variations in said integrated lead suspension tails and said main flex cable.

19. The method as recited in claim 15, wherein said at least one pin comprises a plurality of pins.

20. The method as recited in claim 19, wherein a pitch of said plurality of pins is adjustable to accommodate variations in said integrated lead suspension tails and said main flex cable.

* * * * *